Figure 1:
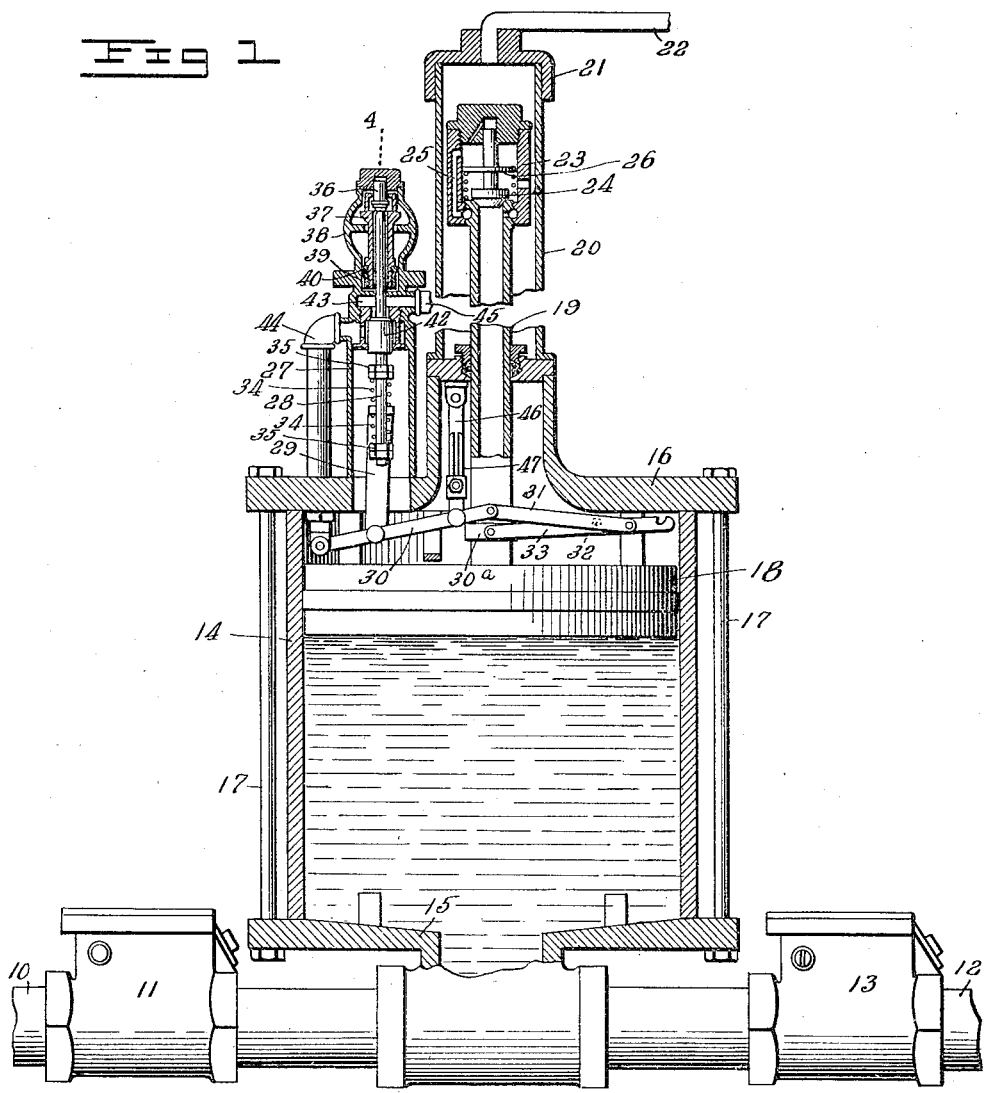

J. W. LYTTON.
PISTON TRAP.
APPLICATION FILED JUNE 27, 1913.

1,122,779.

Patented Dec. 29, 1914.
2 SHEETS—SHEET 1.

Inventor
Jarard W. Lytton

Witnesses

By

Attorneys

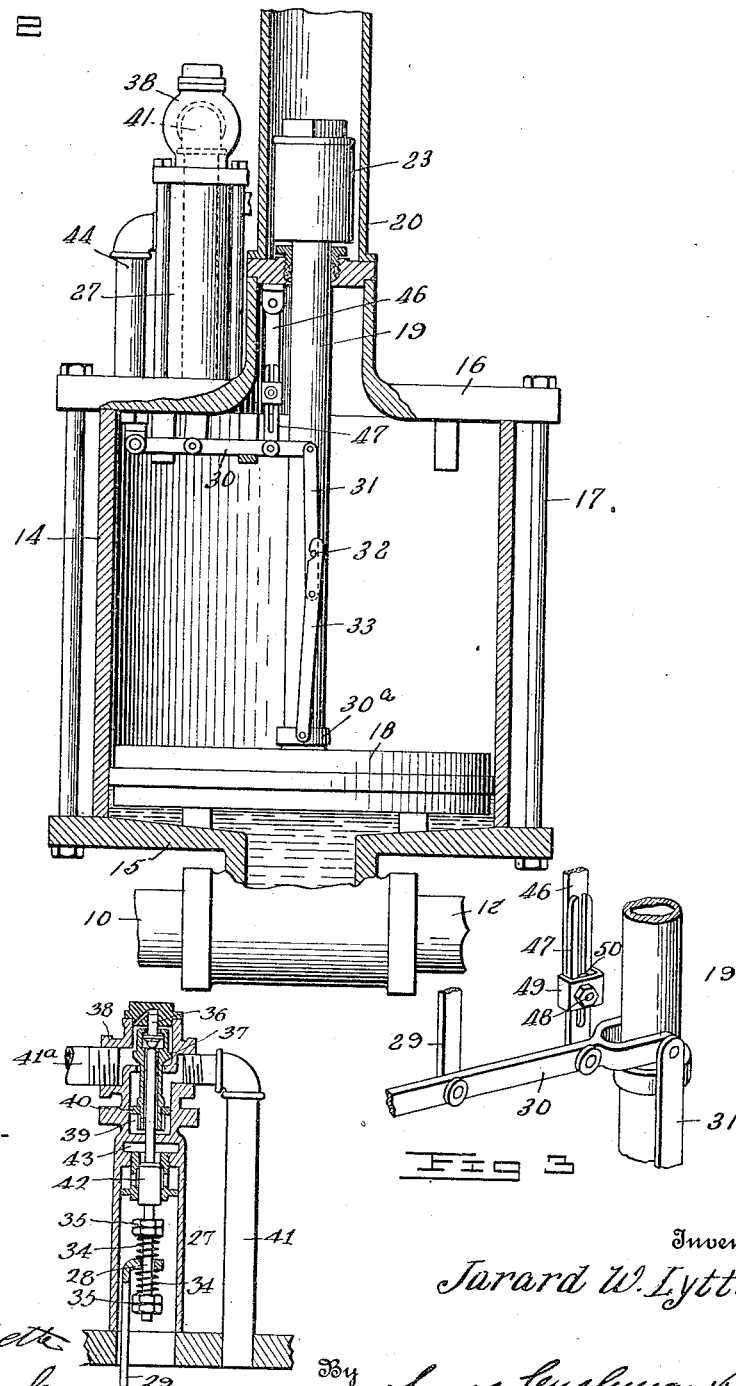

UNITED STATES PATENT OFFICE.

JARARD W. LYTTON, OF FRANKLIN, VIRGINIA, ASSIGNOR TO LYTTON MANUFACTURING CORPORATION, OF FRANKLIN, VIRGINIA, A CORPORATION OF VIRGINIA.

PISTON-TRAP.

1,122,779.  Specification of Letters Patent.  Patented Dec. 29, 1914.

Application filed June 27, 1913.  Serial No. 776,199.

*To all whom it may concern:*

Be it known that I, JARARD W. LYTTON, a citizen of the United States, residing at Franklin, in the county of Southampton and State of Virginia, have invented new and useful Improvements in Piston-Traps, of which the following is a specification.

The present invention relates to traps and feeders of the general type commonly used in steam and vacuum pumps, and is intended for use as a steam return trap in return systems; (a pressure return trap or pump;) a vacuum trap for use in vacuum systems; and allied mechanisms operated by steam, vacuum or other pressure.

It has for its object to provide a piston trap in which a rising and falling piston operates to fill and empty the trap, this piston operation being regular and automatic, and having valve-operating mechanisms associated therewith for opening and closing the valves which control pressures in the trap.

In the drawings herewith I have illustrated one form of my invention, although it will be understood that I do not confine myself to the specific structure shown, as this may be varied within the limits of mechanical skill without departing from my invention.

In the drawings:—Figure 1 is a sectional view of the trap embodying my invention. Fig. 2 is a detail of the lever and link connection between the valve and the piston. Fig. 3 is a perspective view of the pressure-valve operating levers and the friction lock for such mechanism. Fig. 4 is a detail sectional view on line 4—4 of Fig. 1.

Referring to the drawings by numerals, 10 indicates the inlet passage through which liquid to be transferred passes to the trap, a suitable non-return check being provided, as conventionally illustrated at 11. The outlet through which liquid is transferred or forced is shown at 12, a suitable non-return check 13 being provided, as conventionally illustrated.

The trap proper comprises a casing 14 having a bottom plate 15 and head plate 16, which are preferably secured together, in the manner shown, by the tie bolts 17.

Within the trap is mounted the piston 18, said piston having a hollow stem 19 that opens through the piston and extends upwardly into the bonnet 20 through a suitable stuffing box, said bonnet being capped by the plate 21, which is connected by the pipe 22 with any suitable source of vacuum.

The piston stem 19 is provided with a head 23 carrying a valve seat, on which rests a valve 24, said valve being provided with a spring of sufficient strength to just balance the weight of the valve. I provide a by-pass 25 from the hollow stem 19 of the piston around the valve, so as to admit pressure above the valve and against the top thereof, a piston disk 26 of larger area than the valve 24 being mounted on the stem of the valve 24, as shown, and the cap nut of the head 23 has a relief passage to connect the valve chamber with the stem socket.

The head plate 16 is provided with a second bonnet 27 through which extends a valve-operating rod 28, which is linked by a link 29 with a valve operating lever 30, pivoted at one end to a depending fulcrum pivot on the head plate 16. The other end of the lever 30 is coupled by a broken-link coupling to the piston stem, the link member 31 having a pin 32 which is engaged by a notch in the projecting end of the other link member 33 to maintain the parts in alinement when in the position shown in Fig. 2, and prevent their moving past the center when the piston 18 descends, this broken-link connection permitting the link to pivot and break when piston 18 starts to rise, and come to the position shown in Fig. 1 when the piston is at the upper end of its stroke.

The stem 19 is provided with an operating tappet 30$^a$ which, as shown in Fig. 1, engages the forked end of the lever 30 as the piston 18 moves upwardly, so as to swing said lever on its fulcrum pivot, the broken-link coupling taking the position shown in Fig. 1.

The upward movement of the lever 30 will, through the link 29 and valve operating rod 28 actuate the pressure controlling instrumentalities in bonnet 27; the link 29 being connected to rod 28 by a yielding connection, comprising springs 34 between adjustable lock nuts 35, for the purpose of giving a yielding thrust to the stem 28, which yielding connection, while sufficiently positive to operate the pressure valve parts, presently to be described, insures sufficient lost motion to prevent any breaking of the parts due to sudden movements, or overthrow of the actuating mechanism.

The rod 28 engages at its upper end a preliminary valve 36 mounted in the main valve 37, which is seated in the valve housing 38 at the top of the bonnet 27, and movement of this preliminary valve 36 at once admits pressure from above the valve 37 through the bore thereof to the chamber 39 and below the piston 40 of the valve, which piston, being of larger area, will, when subjected to pressure, lift the valve 37 from its seat and admit pressure to the top of the piston 18 by way of passage 41, shown in Fig. 4 leading from the valve housing 38, pressure entering said housing through the pipe 41ª.

The valve stem 28 is provided with a cylindrical valve 42 which, when the valve 37 is open, seats against a suitable valve seat and closes communication between the chamber 43 and the trap 14, said chamber being connected with the trap by means of the pipe 44, and communicating through the pipe 45 on the other side of the valve 42 with atmosphere, or, if desired, with a source of vacuum.

In operation the piston 18 will rise from the position shown in Fig. 2 to the position shown in Fig. 1, the inflow from the passage 10 filling the trap. As the piston rises it will give an upward thrust to the lever 30, opening the pressure valve through the link 29 and rod 28, admitting steam or other pressure to the trap 14 above the piston 18, which will thrust the piston down and eject the contents of the trap through the passage 12, the non-return check valves 11 and 13 operating, of course, in the usual manner to permit the flow of liquid in one direction only in their respective passages.

It will be understood that vacuum is maintained in the bonnet 20 through the pipe 22 at all times, and when the piston 18 is rising the spring will lift the valve 24 putting the hollow stem 19 into communication with the bonnet 20 and relieving any pressure below the piston 18 so as to insure complete filling of the trap. When the trap is filled, and the pressure valve mechanism has been operated to introduce ejecting pressure above the piston 18, and when the piston starts to descend, pressure passing up the hollow piston stem will go through the by-pass 25 to the piston disk on the stem of the valve 24, which piston disk, as stated, fits closely in the valve chamber. This disk being of larger area will at once close the valve 24 against its spring, and prevent escape of pressure through that valve into the vacuum chamber.

In order that the lever 30 and its associated parts will remain in open position until the piston 18 has descended and the trap has been emptied, I provide a friction lock comprising two links 46, 47, which are clamped together, as shown in Fig. 3, by means of a spring clamp formed of a bolt 48, clamping plate 49, and tensioning spring 50, the clamping plate 49 embracing the edges of the link members so as to maintain them in parallelism. The tension of the spring 50 may be varied so as to give a sufficient grip and friction between the parts to maintain the parts in the position shown in Fig. 1, where the members 46 and 47 of the link are telescoped together by the upward thrust of the tappet collar on lever 30, and this frictional lock is sufficient to sustain the weight of the valve-operating parts and the valve, so as to insure a continuance of pressure above the piston 18 for a period long enough to completely empty the trap. When, however, the piston 18 descends, breaking-links 31, 32 will gradually straighten out from the position shown in Fig. 1 to that shown in Fig. 2, and immediately the pull of the piston becomes effective on the lever 30 through this broken-link connection, said lever will be pulled downwardly, the frictional locking link will be extended, and the pressure valve 37 will close.

While I have shown and described the particular construction, it will be understood that it may be widely varied, and other mechanical expedients adopted in place of those shown without departing from the spirit of my invention.

I claim:—

1. In a device of the class described, the combination with a casing having a fluid inlet, a fluid outlet and a pressure inlet; of a valve controlling said pressure inlet, valve operating mechanism, means within said casing dividing it into a fluid receptacle and a pressure receptacle, and movable alternately to opposite ends of the casing, said means adapted to positively actuate the valve operating mechanism, and a vacuum chamber in communication with the casing on the fluid side of said movable dividing means.

2. In a device of the class described, the combination with a casing having a fluid inlet, a fluid outlet, a pressure inlet and a pressure outlet; of valves controlling said pressure inlet and said pressure outlet, valve operating mechanisms, means within said casing dividing it into a fluid receptacle and a pressure receptacle and movable alternately to opposite ends of the casing, said means adapted to positively actuate the valve operating mechanisms, and a vacuum chamber in communication with the casing on the fluid side of said movable dividing means.

3. In a device of the class described, the combination with a casing having a fluid inlet, a fluid outlet, and a pressure inlet; of a valve controlling said pressure inlet, valve operating mechanism, a piston in said casing dividing the same into a fluid receptacle and a pressure receptacle and movable alternately to opposite ends of the casing, said piston adapted to positively actuate the valve operating mechanism, and a vacuum chamber in communication through the piston with the fluid receptacle.

4. In a device of the class described, the combination with a casing having a fluid-inlet, a fluid-outlet, and a pressure-inlet; of a valve controlling said pressure-inlet, valve-operating mechanism, a piston in said casing to actuate said mechanism, and a vacuum chamber communicating through the stem of the piston with said casing below said piston.

5. In a device of the class described, the combination with a casing having a fluid-inlet, a fluid-outlet, and a pressure-inlet; of a valve controlling said pressure-inlet, valve-operating mechanism, a piston in said casing to actuate said mechanism, a vacuum chamber communicating through the stem of the piston with said casing below said piston, and a valve controlling said piston-stem passage.

6. In a device of the class described, the combination with a casing having a fluid-inlet, a fluid-outlet, and a pressure-inlet; of a valve controlling said pressure-inlet, valve-operating mechanism, a piston in said casing for actuating said mechanism and provided with a hollow stem, a vacuum-chamber in which said hollow stem reciprocates, a valve-casing at the upper end of said stem, and a valve in said casing controlling the piston-stem passage.

7. In a device of the class described, the combination with a casing having a fluid-inlet, a fluid-outlet, and a pressure-inlet; of a valve controlling said pressure-inlet, valve-operating mechanism, a piston in said casing for actuating said mechanism and provided with a hollow stem, a vacuum-chamber in which said hollow stem reciprocates, a valve-casing at the upper end of said stem, and a valve in said casing closing under pressure and opening under vacuum controlling said piston-stem passage.

8. In a device of the class described, the combination with a casing having a fluid-inlet, a fluid-outlet, and a pressure-inlet; of a valve controlling said pressure-inlet, valve-operating mechanism, a piston having a hollow stem, a vacuum-chamber in which said stem reciprocates, a valve-casing at the upper end of said stem, a valve in said casing controlling the piston-stem passage, a by-pass in said valve-casing to admit pressure above the valve and maintain it in closed position, and a passage from said vacuum-chamber to said valve-chamber.

9. In a device of the class described, the combination with a casing having a fluid-inlet, a fluid-outlet, a pressure-inlet, and a pressure-outlet; of valves controlling said pressure-inlet and said pressure-outlet, a single operating mechanism in said casing for said valves, a rising and falling piston in said casing to actuate said mechanisms, a vacuum-chamber, a hollow piston-stem reciprocating in said vacuum-chamber through which said chamber communicates with said casing below the piston, a valve casing carried by said stem, and a pressure and vacuum control valve for the piston-stem passage.

10. In a device of the class described, the combination with a casing having a fluid-inlet, a fluid-outlet, and a pressure-inlet; of valve mechanism controlling said pressure-inlet, a rising and falling piston in said casing, a tappet on the piston-stem to actuate said valve mechanism on its upward stroke, a toggle joint between said piston and said mechanism to actuate said mechanism on the downward stroke of said piston, and means to prevent said joint from breaking in but one direction.

11. In a device of the class described, the combination with a casing having a fluid inlet, a fluid outlet, and a pressure inlet; of valve mechanism controlling said pressure inlet, a rising and falling piston in said casing, a lever connected to said valve mechanism for operating the same, a tappet movable with said piston to actuate said lever on its upward stroke, a two-part hinged coupling connected at one end to said lever and at the other end to the piston and operated only on the downward stroke of the piston to actuate said lever, and a pin on one of the members of said hinged coupling adapted to engage the other member at the limit of the downward stroke of the piston to prevent said members assuming a straight line.

In testimony whereof I have hereunto set my hand in presence of two subscribing witnesses.

JARARD W. LYTTON.

Witnesses:
C. C. VAUGHN, Jr.,
D. M. WILLIS.